UNITED STATES PATENT OFFICE.

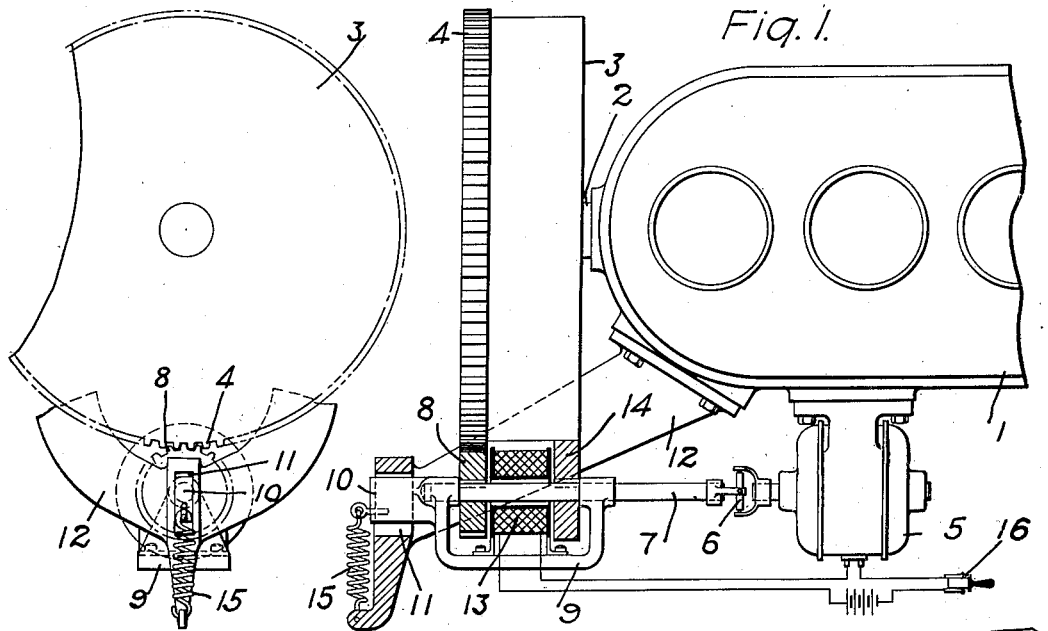
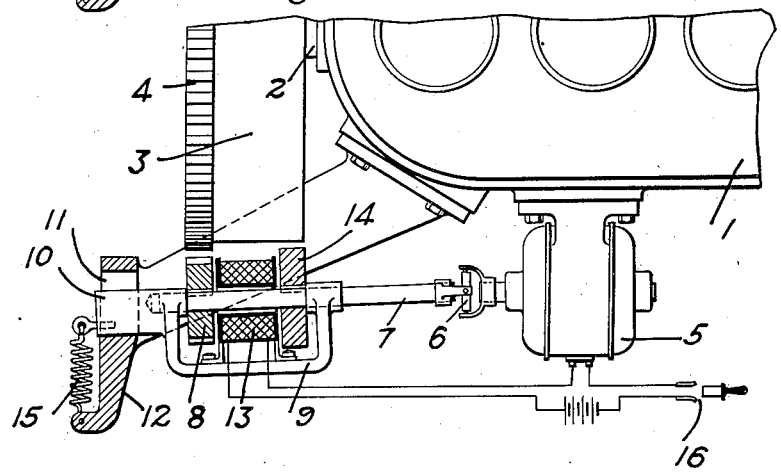

WILLIAM A. DICK, OF PITTSBURGH, PENNSYLVANIA, ASSIGNOR TO WESTINGHOUSE ELECTRIC AND MANUFACTURING COMPANY, A CORPORATION OF PENNSYLVANIA.

STARTING MECHANISM FOR AUTOMOBILES.

1,332,032.  Specification of Letters Patent.  Patented Feb. 24, 1920.

Application filed August 28, 1915. Serial No. 47,853.

*To all whom it may concern:*

Be it known that I, WILLIAM A. DICK, a citizen of the United States, and a resident of Pittsburgh, in the county of Allegheny and State of Pennsylvania, have invented a new and useful Improvement in Starting Mechanisms for Automobiles, of which the following is a specification.

My invention relates to starting mechanisms for automobiles, and particularly to such mechanisms as embody dynamo-electric machines which may be operatively connected to the engine shafts by automatically controlled means.

My invention has for its object to provide a simple and efficient arrangement whereby the engine fly wheel is utilized to form a portion of a magnetic circuit for maintaining the operative connection between the engine fly wheel and a coacting wheel.

It has been proposed, heretofore, to employ starting devices which embody friction wheels that are shifted laterally into engagement with the fly wheel. In such arrangements, great difficulty has been encountered in causing sufficient pressure to be exerted on the shiftable member to prevent relative movement of the respective engaging surfaces without employing heavy and complicated structures. It is necessary, also, in such cases, to provide bearings of a special construction which will withstand an abnormal pressure.

The objectionable features of the arrangement above described are avoided in the present invention by the substitution of a gear wheel for the laterally shiftable friction wheel. The movable gear wheel coacts with gear teeth with which the fly wheel is provided. The engagement of the coacting gear wheels is controlled automatically by an electromagnet, the coil of which is in circuit with the electric starting motor. In order to insure that the coacting gear wheels are brought into proper relation for operative engagement, the inward movement of the shiftable pinion is limited by a disk which rolls upon the periphery of the fly wheel. The disk forms a part of the magnetic circuit which includes the coacting gear wheels and the fly wheel, the rotatable shaft constituting the core of the electromagnet.

In the accompanying drawing, Figure 1 is a view, partially in plan and partially in section, of a portion of an internal combustion engine with my invention applied thereto. Fig. 2 is an end view of the mechanism of Fig. 1, parts being broken away. Fig. 3 is a view, similar to Fig. 1, with the various parts in their respective inoperative positions.

An internal combustion engine 1, only a portion of which is shown, has a crank shaft 2 and a fly wheel 3 that is provided with gear teeth 4. An electric motor 5, which is secured to the engine structure by any suitable means, is connected by means of a universal joint 6 and a shaft 7 to a pinion 8 which coacts with the gear teeth 4.

The shaft 7 is rotatably mounted in a laterally movable member 9 which is provided, at its outer end, with a rectangular portion 10. The rectangular portion 10 projects into a slot 11 of a stationary member 12, the sides of the slot thus constituting a guide for the member 9 during its lateral movement and a thrust member during the operation of the motor.

A coil 13, which is secured to the member 9, is connected in series with the electric motor 5. The magnetic circuit of the coil comprises a part of the shaft 7, the pinion 8, gear teeth 4, fly wheel 3, and a disk 14, of magnetic material.

The disk 14 is mounted on the shaft 7 and coacts with the fly wheel 3 to limit the inward movement of the pinion 8 with respect to the fly wheel in order that the gear teeth may assume their proper relations when their operative engagement is effected. The disk may be keyed to the shaft 7, as illustrated, in which case it operates, by reason of its frictional engagement with the fly wheel, to assist the pinion 8 in rotating the crank shaft. If desired, the disk 14 may be loosely mounted on the shaft 7 in order to avoid the necessity for accurate dimensions such as exists when the disk is fixed to the shaft. A spring 15 normally holds the member 9 and its associated parts in their respective positions as illustrated in Fig. 3, the universal joint 6 permitting the lateral movements of the shaft 7 relatively to the shaft of the motor 5 to which it is connected.

To start the engine, the circuit of the motor 5 is closed by any suitable means, as, for example, a switch 16 diagrammatically illustrated in Figs. 1 and 3. Since the circuit comprising the coil 13 is of low resistance and the motor armature is stationary, a heavy current traverses the series coil 13. A magnetic circuit is energized which comprises the shaft 7, pinion 8, gear teeth 4, fly wheel 3 and disk 14.

The pinion 8 and its associated parts are immediately drawn toward the fly wheel 3 to effect the engagement of the pinion 8 and the gear teeth 4. The disk 14 insures that the pinion 8 will assume such position that the axis of the shaft 7 substantially coincides with that of the motor 5 and that the proper clearances will be maintained between the teeth of the respective gear wheels. The motor then rotates the engine shaft through the connections just described. Since the coil 13 is in series with the motor, the current traversing it and the attracting force between the fly wheel and the pinion 8 and disk 4 will vary in accordance with the load upon the motor.

When the engine starts under its own power, the motor will be driven at such speed that its counter electromotive force substantially equals that of the battery, and little or no current traverses the motor windings and the coil 13. Since the atttraction between the relatively movable parts varies approximately as the square of the current traversing the circuit, the magnetic pull is greatly reduced and the spring 15, which has been placed under tension, then operates to return the member 9 and its connected parts, including the pinion 8, to their respective normal positions. The disconnection of the motor from the fly wheel occurs automatically even though the operator holds the switch 16 closed after the engine starts. The motor then operates independently until its circuit is opened.

The advantages of a starting mechanism arranged in accordance with my invention are that a positive driving connection may be established between the motor and the engine shaft. Since there is little or no tendency for the pinion to become disengaged from the fly wheel during the cranking of the engine, it is necessary that the electromagnetic force be only such as to insure that the pinion 8 will be drawn into operative relation upon the closing of the motor circuit.

In view of the small force necessary to maintain the pinion in engagement with the gear teeth of the fly wheel, the bearings in the member for supporting the rotatable shaft may be of the usual construction. Because of the small movement required to effect the operative engagement of the coacting gear wheels, there is no danger of damaging the gear teeth because of the impact of heavy rapidly moving parts, such as is experienced in certain forms of starting mechanisms in which the coacting members are shifted longitudinally.

Many modifications may occur to those skilled in the art to which my invention appertains and it is understood that such changes may be made as fall within the scope of the appended claims without departing from the spirit of my invention.

I claim as my invention:

1. In a starting mechanism for automobiles, the combination with an engine, of a gear wheel operatively connected thereto, an electric motor, a gear wheel laterally movable into, and out of, mesh with said engine gear wheel, means comprising a universal joint for operatively connecting said movable gear wheel to said motor, an electromagnet for controlling the lateral movement of said motor gear wheel into engagement with the engine gear wheel, means for simultaneously controlling said electric motor and said electromagnet, and means for automatically disengaging said gear wheels upon starting of the engine.

2. In a starting mechanism, the combination with an engine member and an electric motor, of means for operatively connecting said motor to said engine, said means comprising a member laterally movable into and out of engagement with the engine member, means comprising a universal joint for operatively connecting said movable member to said motor, an electromagnet having a coil in circuit with said motor for moving said movable member into engagement with said engine member, means for simultaneously controlling said motor and said magnet, and means for disengaging said members upon starting of the engine.

3. In a starting mechanism, the combination with an engine member and an electric motor, of means for operatively connecting said motor to said engine, said means comprising a member laterally movable into and out of engagement with the engine member, and means for engaging the engine member to limit the movement of the movable member.

4. In a starting mechanism, the combination with an engine member and an electric motor, of means for operatively connecting said motor to said engine, said means comprising a member laterally movable into and out of engagement with the engine member, an electromagnet for actuating said movable member, and means for engaging the engine member to limit the movement of the movable member and to constitute a part of the magnetic circuit of said electromagnet.

5. In a starting mechanism, the combination with an engine and a gear wheel operatively connected thereto, of an electric motor, a gear wheel operatively connected to said motor and laterally movable into and out of mesh with the engine gear wheel, an electromagnet for controlling said movable gear wheel, and a member movable therewith for limiting the movement of said gear wheel and constituting a part of the magnetic circuit of said electromagnet.

6. In a starting mechanism, the combination with an engine and a gear wheel operatively connected thereto, of an electric motor, a gear wheel operatively connected to said motor and laterally movable into and out of mesh with the engine gear wheel, an electromagnet for controlling said movable gear wheel, and movable therewith for moving said motor gear wheel into engagement with said engine gear wheel, said electromagnet having a coil in series with said motor, and means for automatically disconnecting the gear wheels upon starting of the engine.

7. In a starting mechanism for automobiles, the combination with an engine member having gear teeth, of a gear wheel laterally movable into, and out of, mesh with said gear teeth, an electric motor provided with a shaft comprising universally connected parts, one of which constitutes the armature shaft and the other of which carries said gear wheel, an electromagnet on said other part adjacent said gear wheel and adapted to coöperate with said engine member to move said gear wheel laterally into mesh with said gear teeth to establish a positive mechanical driving connection between the motor and engine, and means for simultaneously controlling said electric motor and said electromagnet.

In testimony whereof I have hereunto subscribed my name this 12th day of August, 1915.

WILLIAM A. DICK.

---

It is hereby certified that in Letters Patent No. 1,332,032, granted February 24, 1920, upon the application of William A. Dick, of Pittsburgh, Pennsylvania, for an improvement in "Starting Mechanisms for Automobiles," an error appears in the printed specification requiring correction as follows: Page 3, lines 14-15, claim 6, strike out the words "controlling said movable gear wheel, and movable therewith for"; and that the said Letters Patent should be read with this correction therein that the same may conform to the record of the case in the Patent Office.

Signed and sealed this 13th day of April, A. D., 1920.

[SEAL.]

M. H. COULSTON,

*Acting Commissioner of Patents.*

Cl. 290—38.